US008839695B2

(12) United States Patent
Newman

(10) Patent No.: US 8,839,695 B2
(45) Date of Patent: Sep. 23, 2014

(54) WIRE STRIPPING DEVICE

(76) Inventor: Jerry Lee Newman, Renton, WA (US)

(*) Notice: Subject to any disclaimer, the term of this patent is extended or adjusted under 35 U.S.C. 154(b) by 186 days.

(21) Appl. No.: 13/342,896

(22) Filed: Jan. 3, 2012

(65) Prior Publication Data

US 2012/0167719 A1 Jul. 5, 2012

(30) Foreign Application Priority Data

Dec. 31, 2010 (CN) .......................... 2010 3 0705094

(51) Int. Cl.
*H02G 1/12* (2006.01)
*H01B 15/00* (2006.01)

(52) U.S. Cl.
CPC ............ *H02G 1/126* (2013.01); *H01B 15/006* (2013.01)
USPC ........................................................ 81/9.51

(58) Field of Classification Search
USPC ................. 81/9.51; 30/90.1, 90.4, 90.8, 90.9; 83/425.2, 425.3, 430, 431, 947, 949, 83/950
See application file for complete search history.

(56) References Cited

U.S. PATENT DOCUMENTS

| 2,434,640 | A | * | 1/1948 | Burdwood ...................... 83/430 |
| 3,822,615 | A | * | 7/1974 | Reed ............................... 81/9.51 |
| 3,951,727 | A | * | 4/1976 | Greenberg ..................... 156/759 |
| 4,179,804 | A | * | 12/1979 | Maytham ....................... 30/90.7 |
| 4,339,967 | A | * | 7/1982 | Greenberg ..................... 81/9.51 |
| 5,105,702 | A | * | 4/1992 | Fara ................................. 83/425 |
| 5,107,735 | A | * | 4/1992 | Ramun et al. ................... 83/407 |
| 5,806,188 | A | * | 9/1998 | Caraballo ....................... 30/92.5 |
| 5,809,652 | A | * | 9/1998 | Ducret ............................ 30/90.7 |

* cited by examiner

Primary Examiner — David B Thomas
(74) Attorney, Agent, or Firm — Donn K. Harms

(57) ABSTRACT

A device for removing an insulation jacket from a wire core of an insulated wire or cable is provided for encouraging recycling. The device employs cutting blades engaged to a first roller to cut a slice along the length of an inserted insulated wire or cable. A frictional engagement between the distal edge of the blade and an opposing recess surface provides for translation of the length of wire through the device during rotation of one or both of the blade and recess surface. Translational movement of the blades and a biasing force can enhance the frictional engagement and provide a distance of travel to prevent cutting of the insulated wire or cable.

17 Claims, 3 Drawing Sheets

WIRE STRIPPING DEVICE

BACKGROUND OF THE INVENTION

1. Field of the Invention

This application claims priority to Chinese Application Serial Number 201030705094.5 filed on Dec. 31, 2011, and incorporated herein by reference in its entirety.

The present invention relates to devices for stripping the insulating jacket from electrical wire. More specifically, the invention relates to a self adjusting wire stripping device for industrial employment, especially in recycling, wherein tensioned cutting blades are employed for cutting the insulating jacket from large amounts of wire being recycled and which automatically adjust to proper cutting for stripping as the elongated wire passes through it.

2. Prior Art

In order to protect the environment from over-use of raw materials, in the modern world many countries encourage recycling of prior-refined materials. In the case of products formed of metals from mining, such recycling saves huge amounts of energy required to mine the metal ore, as well as to refine it and extrude a metal product. In the case of wire and cable formed of copper and aluminum, the savings are substantial in energy as well as in reducing the amount of mining and tailings and other environmental concerns which result from mining. Further, the carbon savings resulting from eliminating the huge amount of electrical energy which employed in refining, and mechanical energy required for mining, is substantial.

In the recycling business, many recycling facility yards offer money in exchange for the metal inside new or used wire and cable presented for recycling. In the case of insulated cable and wire, conventionally, consumers and businesses desiring to recycle such wire or cable are given two choices for presenting the wire or cable to the recycle yard. As a first option, the consumer or business may present the wire or cable 'as is', still in the conventional insulating jacket. The second choice is to present the wire or cable as the bare metal where the insulating jacket is removed. As could be imagined, many recycling yards will offer considerably more money for bare metal wire and cable since removal of the insulating jacket, which is generally not recycled, involves a substantial labor and energy cost to the buying recycler. The increase in revenue can be substantial, and consequently, the desire to strip the insulating jacket of wire is therefor considerable.

As a conventional solution, many users will attempt to strip the wires by hand, employing a hand held wire stripper device or possibly a razorblade. The insulation being flexible plastic adheres to the axially running wire and is designed to remain so adhered. Consequently, it takes much effort to slice a side of the insulation down to the cable and then peel off the jacket from the wire center. However, should the user have a considerable length of wire or multiple wires, the hand held method is far too time consuming and tiring. Further stripping by hand can be very dangerous since the blade employed by nature must be very sharp to cut the plastic to the wire core.

Another solution involves the employment of wire stripping devices wherein the wire or cable is drawn over a cutting blade. The blade in such a device is positioned to cut through the insulating jacket surrounding the wire only, therefor allowing the jacket to be split along the cut line and then removed without severing the metal wire. For these devices, the disposition and positioning of the cutting blade to only slice the plastic jacket, requires that the covered wire and other wire feeding components be carefully determined and then positioned relative to the cutting blade, for each size and wire type used. If the blade does not cut deep enough, the jacket cannot be removed, and if the blade cuts too deep, the metal wire may be severed which stops the automatic action while the wire must be re-feed into the device thereby wasting additional time and effort.

Current conventionally employed and available manual wire stripping devices employ manual user-adjusted components and methods to adjust the position of the plastic jacket slicing blade in order to properly cut through the wire jacket. These methods are time-consuming especially when changing between different size wires, as each diameter wire type will require different adjustment depending on the plastic jacket thickness and the diameter of the axially running wire. Problems also often occur when initially feeding the wire into the blade.

As such, there is a continuing unmet need for an improved wire stripping device. Such a device should be easy to use and allow the user to strip varying sized and shaped wires and allow for self-positioning of a plurality of sizes of incoming wire with different wire diameters and plastic jacket thicknesses while requiring little or no adjustment to the device.

SUMMARY OF THE INVENTION

The device herein disclosed and described provides a solution to the shortcomings in prior art and achieves the above noted goals through the provision of an automatic wire stripping device providing a plurality of wire feed channels and tensioned cutting blades which are configured to adapt to a plurality of incoming wire diameters and plastic jackets. The blades are preferably configured with a means to bias them toward the axially running wire, such as with spring tensioning or elastic tensioning, or magnetic or hydraulic biasing, wherein the biasing force can be adjusted as needed. Once adjusted, the force is maintained during an entire stripping session and one biasing force may be employed for a plurality of plastic jacket thicknesses. In a first preferred mode of the device a drawing of the cable or wire therethrough is powered by an electric motor or more preferably a hand crank where such is impractical or where electricity is unavailable or where more power is desired for saving. Power in other modes may be provided by an electric motor operatively engaged such as a hand drill and chuck or other driving means with connection means adapted to automatically drive the device.

In all modes, the device is configured to slice and then strip the plastic or other dielectric material forming the jacket from numerous types, sizes and varieties of scrap or new electrical wire or cable. The device generally consists of a first cutting wheel or roller having one or a plurality of spaced annular cutting blades. The cutting blade roller is disposed adjacent to a second support roller having a plurality of spaced and variably-sized recess-channels which are positioned to place the jacket of the wire draw therethrough, inline with cutting blades operated by the first roller.

In use, the user feeds wire into the appropriately sized channel matching the size or circumference of the jacketed wire or cable placed in the corresponding channel. For each use, the wire is preferably precut in a length determined for easy user-handling, for example approximately four feet in length.

Once the wire or cable is engaged in the recess and in frictional engagement with the support roller, the user will next cause a rotation of the drive roller using means for powered rotation such as an electric motor or a turning of a hand wheel or crank that rotates the cutting blades, driving the device, and feeding the wire therethrough. The wire will catch between the blade roller and channeled support roller drawing the remaining wire through the device and cutting the insulating jacket.

At this point in the process, the user may either continue to turn the hand wheel or crank until the wire is completely drawn through the device, or they can manually pull the wire through the machine from the exit point on an exit side by hand until the wire is completely drawn therethrough. During traverse through the device, the plastic jacket of the wire or cable is cut along one side substantially to the surface of the axially running wire or cable, by the cutting blade such that the user can pull the wire out from the wire jacket ultimately separating the metal from the wire jacket.

The cutting blade roller providing the power to move the cable or wire through the device, is preferably configured with a means to bias it toward the axial metal core of the wire, such as spring tensioning means, elastic band, hydraulic biasing means, or other means to force the blade toward the axial center of the cable or wire. This biases the blade roller toward the channeled support roller at a user-determined tension force. Bias adjustment can be accomplished by a screw or other means that compresses or relieves the spring tension. As such, the user can configure the blade roller biasing force to insure the force on the wire from the annular blades is sufficient only to sever the insulating jacket, but concurrently insufficient to sever the wire or cable itself.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of the invention to provide an easy to use wire stripping device which encourages recycling.

It is another object of the invention to provide a wire stripping device employing adjustable and biased blades for adjusting the force of the blades on an operatively fed wire to avoid severing while concurrently easily severing the plastic jacket for an easy removal.

It is yet another object of the invention to provide a wire stripping device that is either manually or automatically driven whereby it may be employed with or without electrical power.

BRIEF DESCRIPTION OF DRAWING FIGURES

DETAILED DESCRIPTION OF THE PREFERRED EMBODIMENTS OF THE INVENTION

Figure 1:
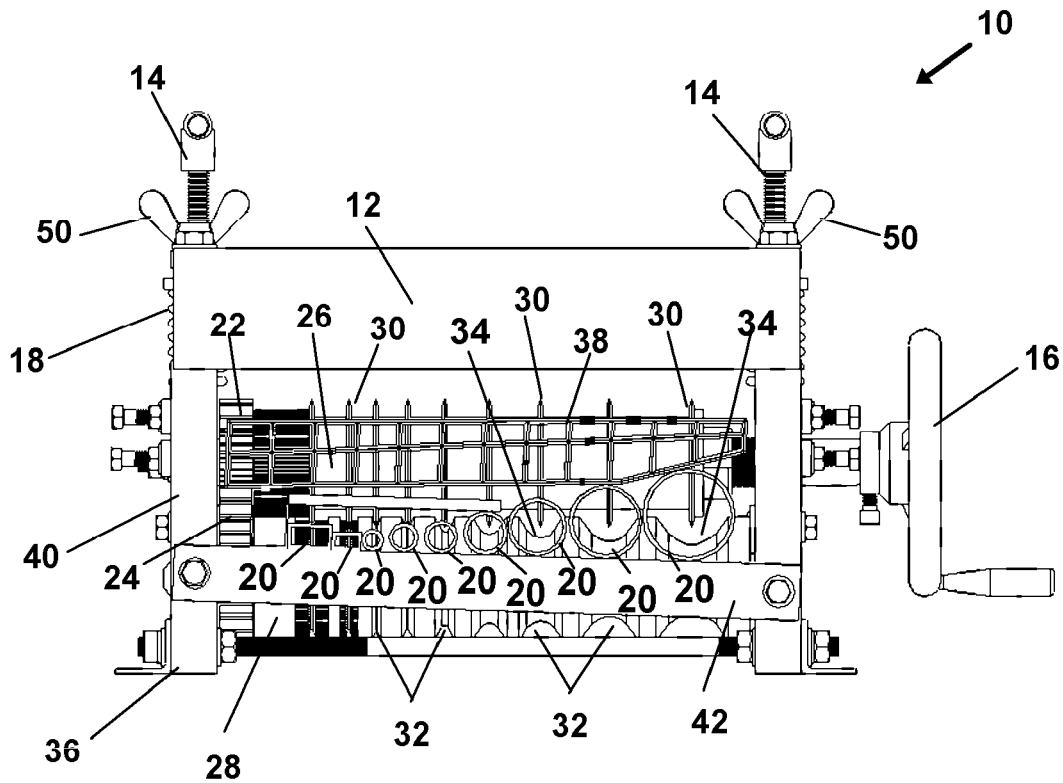
FIG. 1 shows a front view of a particularly preferred mode of the device.
Figure 2:
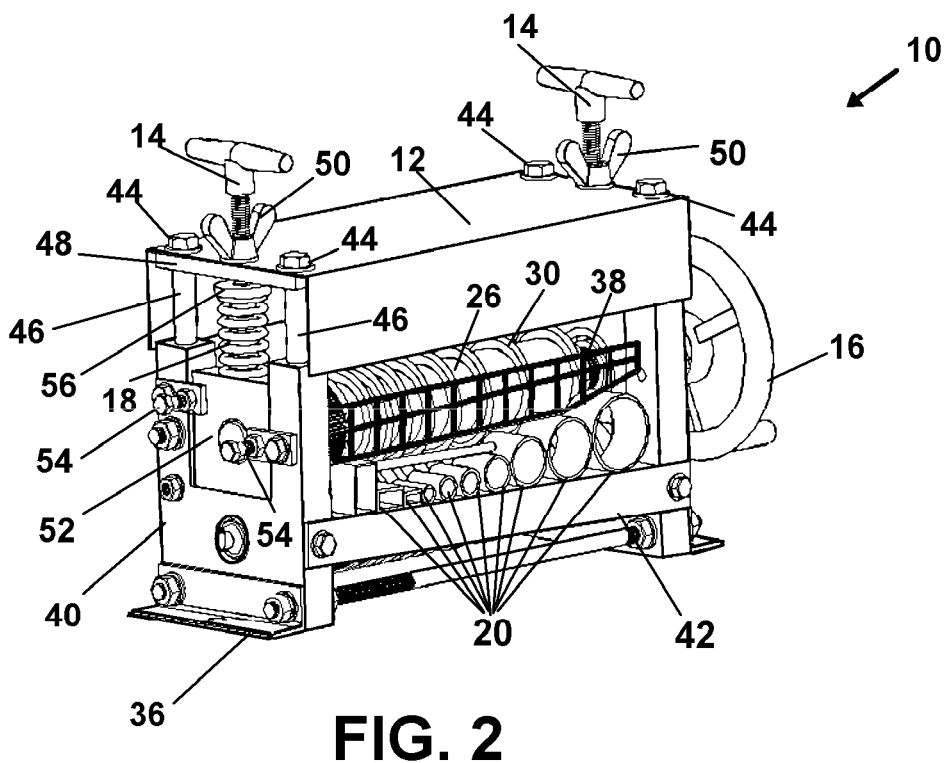
FIG. 2 is a left elevated perspective view of the device.
Figure 3:
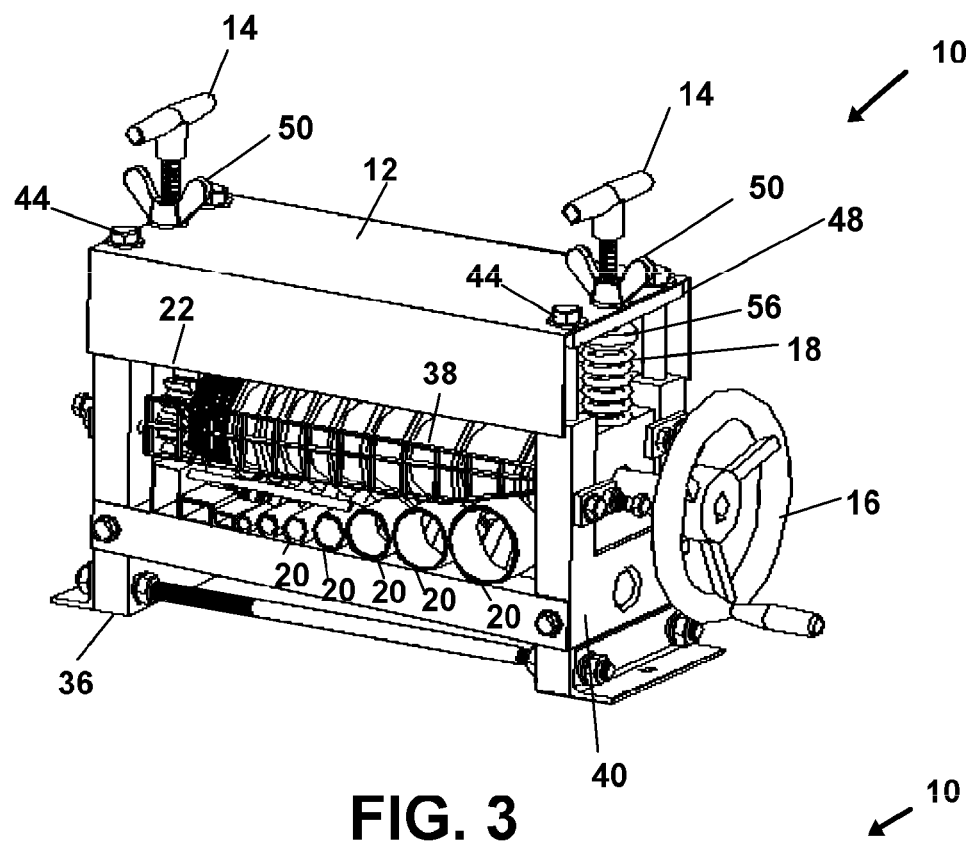
FIG. 3 is a right elevated perspective view of the device.
Figure 4:
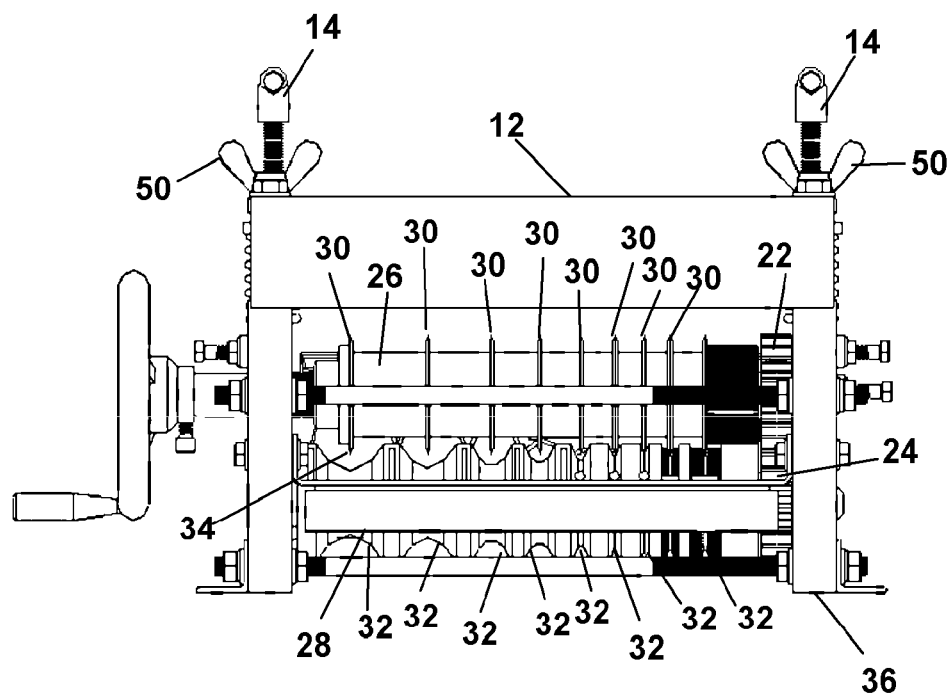
FIG. 4 is rear view of the device.

Now referring to drawings in FIGS. 1-6, wherein similar components are identified by like reference numerals, there is seen in FIG. 1-FIG. 4 views of the particularly preferred mode of the wire stripping device 10 intended to strip the jacket from electrical wire.

A shroud 12 forms the top of the frame 40 of the device 10 and serves as a protector and safety guard from the rotating or rolling knife blades 30 engaged with the first roller 26. Spring tensioning bolts 14 communicate through the shroud 12 and engage the bolt centering stop 56. The spring tensioning bolt 14 can be adjusted by rotating it in a direction to compress or lengthen the underlying spring 18 and thereby apply more or less tension to the spring 18 to impart more or less bias against the blades 30 toward the second roller 28 and through the insulation jacket 37 (FIG. 6) and against the side surface of an engaged wire core 35 side surface. This causes a compression of the wire core 35 and lower portion of the insulation jacket 37 between the blade 30 and the second roller 28 such that rotating the blade 30 will move the compressed wire through the device 10. The hand wheel or crank 16 connects to the first roller 26 and drives the roller 26 and engaged blades 30 to rotate forward or reverse and move the wire compressed as noted above in the direction of the rotation and through the device 10. It has been found that rotating the blade 30 to both cut the insulation jacket and move the compressed wire works better than rotating the lower second roller 28 to feed the wire through the device 10.

As noted, the biasing force from the spring 18 applies a biasing force to the first roller 26 and engaged blade 30. This also allows the roller 26 to deflect upwards as wire is passed in the space 34 between the first roller 26 and the second roller 28 should it be bent, deformed, or otherwise not substantially straight. This deflection provides a means for shock absorption for bent or uneven wires and means to prevent a cutting of the wire which might otherwise occur. It must be noted that although the rollers 26, 28 are depicted one atop the other horizontally deployed, it is to be understood that the device 10 is capable of employment in a vertical deployed fashion and is anticipated.

As the first roller 26 moves upwards, the spring tension slowly increases providing enough resistance to the rolling knife blades 30 to cut through the wire insulation jacket 37 until it reaches the metal wire core 35 where it stops cutting and frictionally engages against the core to compress the core 35 and insulation jacket 37 between the side surface of the blade 30 and the lower roller 28 for a compressed frictional engagement therein. The spring tensioning bolt 14 can be adjusted up or down to give more or less spring tension depending on the thickness of the wire jacket 37 and wire core 35 being stripped and to adjusted the amount of compression of the frictional engagement to a nominal state for use. The wing nut 50 can be tightened to lock and keep the spring tensioning bolt 14 from moving during operation as is desired for safety reasons.

The wire feed channels 20 are where the wire is initially inserted before it reaches the intersecting space 34 between the blade engaged to the cutting first roller 26 and bottom of the channeled roller 28 or channel portion attached to the roller, where the wire jacket 37 is physically cut by the rotating or rolling knife blades 30. The wire feed channels 20 have different sizes proportionate to the circumferential size of the jacket of the wire that is fed through that channel. A plurality of increasing sized channels 20 allow for a plurality of differently sized insulated wires to be fed through the device. Further, the channels 20 additionally provide a means to straightened the wire as the wire is fed through the device 10.

Because rotationally powered rollers where both the first roller 26 and second roller 28 provide for a better gripping and powering of the wire through the device 10, in the preferred mode, the first roller gear 22 is an integral part of the first roller 26 that communicates with the bottom roller gear 24. Power imparted to the first roller is therefor communicated from the first roller 26 to second roller 28. Should a slippage against the wire core or insulation jacket occur when compressed therebetween, the rotational power on the opposite side will keep the wire translating through the device 10.

As can be seen, individual rolling annular knife blades 30 are disposed at intervals along the first roller 26 and operatively positioned inline with the central portion of the wire channels 32 of the second roller 28. The second roller 28 is preferably disposed below the first roller 26 and has individual grooves formed within the channels 32 for different size circumferences of jacketed wire to pass through and further defining the space 34 wherein the wire is fed. The rotating or rolling knife blades 30 cut the wire jacket 37 from above the wire 35 as the jacketed wire passes in its compressed engagement through the intermediate space 32 between the blades 30 and channels 32.

Preferably, during use, the device 10 is secured to a bench top or other secure location. The base 36 may include mounting means as needed to best engaged the device 10 to a bench top. This may be accomplished by a hole cut into the center of the base 36 for a bolt or other means of connection to hold the device 10 down. Further, a safety guard 38 is provided to cover the rolling knife blades 30 on the first roller 26.

The device frame 40 is the basic left and right sidewalls of the device 10. The frame 40 is preferably a substantially U shaped stand where the first roller 26 bearing housing 52 engages thereon. However, those skilled in the art will appreciate various other forms and construction suitable as the device frame, and are anticipated. There is a cross frame 42 that engages over the front and back of the device into both left and right sides of the device frame 40 as shown. These cross frames 42 stabilize the device 10 and essentially ties the frame 40 sides into one another. The upper bolts 44 tighten down through the upper spacer 46 and through the upper cross frame 48 providing means to securely engage the shroud 12.

As can be seen, the base of machine 36 engages the frame 40 on both sides of the device 10. The second roller 28 engages into the sides of the frame 40. The frame 40 is engaged to the cross frame 42 on both the front and back side of the frame 40. The first roller 26 fits into the both sides of the bearing housing 52. Further, as can be seen, the first roller 26 is engaged into the top part of the frame 40. The first roller 26 centering bolts 54 are engaged to the frame 40 and provides a means for adjustment wherein they bolts 54 can be tightened or loosened accordingly to center the rolling knife blade 30 in the rolling wire channel 32. This can be viewed at the space 34 between the first roller 26 and bottom roller 34.

As can be seen, the shroud 12 is engaged to the frame 40 with the upper spacer 46 positioned on top of the frame 40 and the upper cross frame 48 is also engaged thereon. With the shroud 12 engaged on top the upper cross frame 49, the four upper bolts 44 are inserted through the shroud 12 through the upper cross frame 48, and through the upper spacer 46 and into the top of the frame 40. The upper bolts 44 are tightened to provided secure engagement. The springs 18 and bolt centering stop 56 are positioned in the center of the top of the first roller 26. The spring tensioning bolts 14 provide a means to compress the springs 18 slightly. The wing-nuts 50 engage the spring tensioning bolts 14 and provide a means to lock the position of the bolts 14.

In use, the user feeds wire into the appropriately sized channel 20 matching the circumferential size of the wire with the corresponding channel 20. For each use, the wire is preferably precut in length, for example approximately four feet in length. The user will next turn a hand wheel or crank 16 that drives the first roller 26, and feed the wire therethrough. The wire will catch in the space 34 between cutting blade roller 26 and channeled roller 28 drawing the remaining wire through the device 10.

The user may either continue to turn the hand wheel or crank 16 until the wire is completely through the device 10 or they can pull the wire through the device 10 from the exit point by hand until the wire is completely through. The wire is cut in the top of one side by the cutting blade such that the user can pull the wire out from the wire jacket ultimately separating the metal from the wire jacket.

Figure 5:
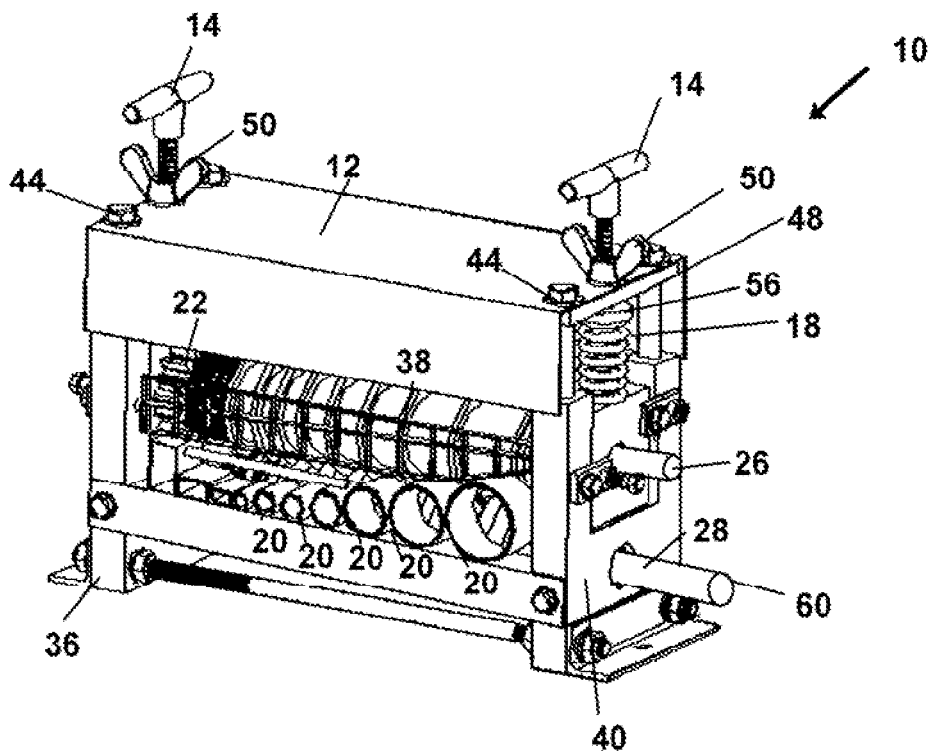
FIG. 5 is a perspective view of another particularly preferred mode of the device.
Figure 6:
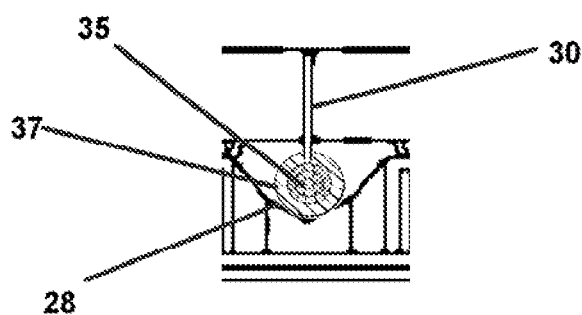
FIG. 6 depicts an enlarged view of the cutting action of the blade through the polymer jacket and the biased compressed engagement of the wire core and underlying jacket between the blade and roller.

Shown in FIG. 5 is yet another particularly preferred mode of the device wherein the second roller 28 includes a shaft extension portion 60 that is adapted for engagement to a drill (not shown) or other means to automatically drive the device 10. the provision of automatic drive may be desired for high volume employment of the device 10.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. An apparatus for removing an insulation jacket from a wire core of an insulated wire or cable, comprising:
   a frame;
   a first roller rotationally engaged with said frame, said first roller having a plurality of annular cutting blades in an engagement therewith, spaced along a length of said roller;
   said cutting blades extending to distal edges from said engagement with said first roller;
   a second roller rotationally engaged with said frame;
   a plurality of annular recessed channels connected to said second roller;
   central portions of said plurality of channels substantially aligned with respective said distal edges of said cutting blades;
   said insulated wire positionable for a frictional engagement between a said distal edge of a respective said blade and a respective said channel aligned with said blade;
   said frictional engagement concurrently providing means to impart a cutting of said insulation jacket by said distal edge of said blade;
   whereby a length of said insulated wire in said frictional engagement is communicated through said apparatus by a powered rotation of one of said first roller or said blade forming said compressed engagement therewith, and said insulation jacket of said insulated wire is imparted with said cutting along said length, thereby allowing a removal of said insulation jacket from said wire core by a peeling therefrom subsequent to a traverse of said length of said wire through said apparatus;

said first roller in a translational rotational engagement with said frame for a substantially parallel movement along a first direction toward said second roller and a first opposite direction away from said roller;

means for imparting a biasing force of said first roller and said blades engaged therewith, toward said second roller;

said biasing force providing means to impart a compression of said insulated wire in said frictional engagement;

said compression providing an enhancement of said frictional engagement; and said first roller in a translational engagement with said frame for a substantially parallel movement along a second direction substantially parallel to said second roller.

2. The wire stripping device of claim 1 further comprising:
said first roller and said blades engaged therewith moveable in a reverse translation said distance away from said second roller during a traversing of bends or imperfections in a shape or a size of said insulated wire through said frictional engagement; and said reverse direction providing means to prevent a cutting of said wire core of said insulated wire and a resulting loss of travel through said device.

3. The wire stripping device of claim 2 further comprising:
means for rotational engagement of said first roller with said second roller; and
said powered rotation is communicated by both said first and said second roller.

4. The wire stripping device of claim 3 further comprising:
said powered rotation is communicated to said apparatus by one of an electrical motor or a hand crank.

5. The wire stripping device of claim 2 further comprising:
said powered rotation is communicated to said apparatus by one of an electrical motor or a hand crank.

6. The wire stripping device of claim 1 further comprising:
means for rotational engagement of said first roller with said second roller; and
said powered rotation is communicated by both said first and said second roller.

7. The wire stripping device of claim 6 further comprising:
said powered rotation is communicated to said apparatus by one of an electrical motor or a hand crank.

8. The wire stripping device of claim 1 further comprising:
said powered rotation is communicated to said apparatus by one of an electrical motor or a hand crank.

9. The wire stripping device of claim 1 wherein the frame includes left and right side U-shaped sidewalls, wherein a shroud is bolted to top surfaces of said U-shaped sidewalls and wherein the left and right side U-shaped sidewalls are connected by a plurality of cross-frame members.

10. The wire stripping device of claim 9 further comprising:
wherein said means for imparting a biasing force of said first roller and said blades engaged therewith, toward said second roller includes a bearing housing installed in each U-shaped sidewall;
one end of the first roller is installed into the bearing housing installed in the left U-shaped sidewall, the other end of the first roller is installed into the bearing housing in the right U-shaped sidewall;
said each bearing housing capable of movement in said first direction within said left and right U-shaped sidewalls;
wherein a spring is installed between an upper surface of each bearing housing and a lower surface of said shroud;
wherein a spring tensioning bolt is installed through two opposing ends of said shroud, each said spring tensioning bolt installed within an interior of each said spring, an end of each spring tensioning bolt is in contact with said upper surface of each bearing housing, wherein turning a handle on each of said spring tensioning bolts in one direction causes said first roller to move in said first direction and turning said handle on each of said spring tensioning bolts in an direction opposite said one direction causes said first roller to move in said first opposite direction, wherein a wing nut clamps each spring tensioning bolt to a top surface of said shroud.

11. The wire stripping device of claim 10 further comprising:
wherein a plurality of rectangular-shaped centering plates are attached on one end of each of the plurality of rectangular-shaped centering plates to an outboard end of each bearing housing and the other end of each of said plurality of rectangular-shaped centering plates covers a portion of an outer surface of one of said bearing plates;
a centering bolt is installed in the other end of each of said plurality of rectangular-shaped centering plates;
rotation of at least one of the centering bolts in one rotational direction causes said first roller to move in said second direction and rotation of at least one of the centering bolts in a direction opposite to said one rotational direction causes said first roller to move in said second opposite direction.

12. The wire stripping device of claim 9 wherein a plurality of wire feed channels are installed on one of said plurality of said cross-frame members.

13. The wire stripping device of claim 1 wherein each said cutting blade is substantially planer and not frusto-conical in shape when directly viewing the cutting edge of the cutting blade.

14. An apparatus for removing an insulation jacket from a wire core of an insulated wire or cable, comprising:
a frame;
a first roller rotationally engaged with said frame, said first roller having a plurality of annular cutting blades in an engagement therewith, spaced along a length of said roller;
said cutting blades extending to distal edges from said engagement with said first roller;
each of said cutting blades is substantially planer and not frusto-conical in shape when directly viewing the cutting edge of the cutting blade;
a second roller rotationally engaged with said frame;
a plurality of annular recessed channels connected to said second roller;
central portions of said plurality of channels substantially aligned with respective said distal edges of said cutting blades;
said insulated wire positionable for a frictional engagement between a said distal edge of a respective said blade and a respective said channel aligned with said blade;
said frictional engagement concurrently imparting a cutting of said insulation jacket by said distal edge of said blade;
whereby a length of said insulated wire in said frictional engagement is communicated through said apparatus by a powered rotation of one of said first roller or said blade forming said compressed engagement therewith, and said insulation jacket of said insulated wire is imparted with said cutting along said length, thereby allowing a removal of said insulation jacket from said wire core by a peeling therefrom subsequent to a traverse of said length of said wire through said apparatus; and said first roller in a translational engagement with said frame for a substantially parallel movement along a first direction substantially parallel to said second roller.

15. The wire stripping device of claim 14 further comprising:
   wherein the frame includes left and right side U-shaped sidewalls;
   one end of the first roller is installed into a bearing housing installed in the left U-shaped sidewall, the other end of the first roller is installed into a bearing housing in the right U-shaped sidewall;
   wherein a plurality of rectangular-shaped centering plates are attached on one end of each of the plurality of rectangular-shaped centering plates to an outboard end of each bearing housing and the other end of each of said plurality of rectangular-shaped centering plates covers a portion of an outer surface of one of said bearing plates;
   a centering bolt is installed in the other end of each of said plurality of rectangular-shaped centering plates;
   rotation of at least one of the centering bolts in one rotational direction causes said first roller to move in said second direction and rotation of at least one of the centering bolts in a direction opposite to said one rotational direction causes said first roller to move in said second opposite direction.

16. An apparatus for removing an insulation jacket from a wire core of an insulated wire or cable, comprising:
   a frame;
   wherein the frame includes left and right side U-shaped sidewalls;
   wherein the left and right side U-shaped sidewalls are connected by a plurality of cross-frame members;
   a first roller rotationally engaged with said frame, said first roller having a plurality of annular cutting blades in an engagement therewith, spaced along a length of said roller;
   one end of the first roller is installed into a bearing housing installed in the left U-shaped sidewall, the other end of the first roller is installed into a bearing housing in the right U-shaped sidewall;
   said cutting blades extending to distal edges from said engagement with said first roller;
   each of said cutting blades is substantially planer and not frusto-conical in shape when directly viewing the cutting edge of the cutting blade;
   a second roller rotationally engaged with said frame;
   a plurality of annular recessed channels connected to said second roller;
   central portions of said plurality of channels substantially aligned with respective said distal edges of said cutting blades;
   said insulated wire positionable for a frictional engagement between a said distal edge of a respective said blade and a respective said channel aligned with said blade;
   said frictional engagement concurrently providing means to impart a cutting of said insulation jacket by said distal edge of said blade;
   whereby a length of said insulated wire in said frictional engagement is communicated through said apparatus by a powered rotation of one of said first roller or said blade forming said compressed engagement therewith, and said insulation jacket of said insulated wire is imparted with said cutting along said length, thereby allowing a removal of said insulation jacket from said wire core by a peeling therefrom subsequent to a traverse of said length of said wire through said apparatus;
   said first roller in a translational rotational engagement with said frame for a substantially parallel movement along a first direction toward said second roller and a first opposite direction away from said roller;
   means for imparting a biasing force of said first roller and said blades engaged therewith, toward said second roller;
   said biasing force providing means to impart a compression of said insulated wire in said frictional engagement;
   said compression providing an enhancement of said frictional engagement.

17. The wire stripping device of claim 16 wherein a plurality of wire feed channels are installed on one of said plurality of said cross-frame members.

* * * * *